United States Patent
Han

(10) Patent No.: US 6,667,773 B1
(45) Date of Patent: Dec. 23, 2003

(54) APPARATUS AND METHOD FOR FORMAT CONVERTING VIDEO

(75) Inventor: Dong Il Han, Seoul (KR)

(73) Assignee: LG Electronics Inc., Seoul (KR)

(*) Notice: Subject to any disclaimer, the term of this patent is extended or adjusted under 35 U.S.C. 154(b) by 379 days.

(21) Appl. No.: 09/685,613

(22) Filed: Oct. 11, 2000

(30) Foreign Application Priority Data

Oct. 12, 1999 (KR) .......................... 1999-44064

(51) Int. Cl.$^7$ .................. H04N 7/01; H04N 11/20
(52) U.S. Cl. .............. 348/441; 348/446; 348/448; 348/447; 348/458; 348/452
(58) Field of Search ................... 348/446, 441, 348/443, 454, 458, 445, 448, 455, 489, 581, 459

(56) References Cited

U.S. PATENT DOCUMENTS

| | | | | |
|---|---|---|---|---|
| 5,864,367 A | * | 1/1999 | Clatanoff et al. | 348/441 |
| 6,061,094 A | * | 5/2000 | Maietta | 348/446 |
| 6,064,450 A | * | 5/2000 | Canfield et al. | 375/240.29 |
| 6,094,226 A | * | 7/2000 | Ke et al. | 348/446 |
| 6,144,412 A | * | 11/2000 | Hirano et al. | 348/441 |
| 6,288,746 B1 | * | 9/2001 | Joo | 348/453 |
| 6,353,459 B1 | * | 3/2002 | Yeh et al. | 348/441 |
| 6,388,711 B1 | * | 5/2002 | Han et al. | 348/441 |
| 2001/0028407 A1 | * | 10/2001 | Joo | 348/453 |

* cited by examiner

Primary Examiner—John Miller
Assistant Examiner—Paulos Natnael
(74) Attorney, Agent, or Firm—Birch, Stewart, Kolasch & Birch, LLP

(57) ABSTRACT

An apparatus and a method for format converting a video are provided, in which an input video is format converted in a horizontal direction according to a horizontal output size to store in a line memory and the image stored in the line memory is format converted in a vertical direction according to a vertical output size, such that the amount of line memory required for converting various kinds of videos including the high resolution video to videos of the NTSC or the standard screen quality video are minimized. An input video is format converted in the horizontal direction and a plurality of the divided lines are temporarily format converted by using a single horizontal format converting unit, so that the required hardware becomes reduced.

21 Claims, 4 Drawing Sheets

APPARATUS AND METHOD FOR FORMAT CONVERTING VIDEO

BACKGROUND OF THE INVENTION

1. Field of the Invention

The present invention relates to a digital television, and more particularly to, an apparatus and method for format converting a video and outputting the video in a different format.

2. Description of the Related Art

According to the introduction of digital TVs and various display apparatuses, more various kinds of images become inputs and outputs in comparison with the existing analogue TVs. In order to convert input images of various sizes into output images of different sizes, a format conversion apparatus is essentially utilized.

Also, the needs to output videos of various formats to the existing NTSC screens have been increased. When converting a high-resolution video format to an NTSC video size by using a general format conversion apparatus, unnecessary memories become wasted.

FIG. 1 shows an example of the related art apparatus for format converting a video.

That is, an input video is stored in a line memory part 101 including a plurality of line memories and is input to a vertical filter 102. The vertical filter 102 limits a bandwidth of the input video for preventing aliasing when reducing the input video in the vertical direction.

A vertical format converting part 103 performs a format conversion in the vertical direction of the video data, which is filtered in the vertical direction in the vertical filter 102, into proper output sizes. A horizontal filter 104 receives an output from the vertical format converting part 103. The horizontal filter 104 also prevents the aliasing possibly generated in an output video by limiting a bandwidth of the input video. The video data, which is filtered in the horizontal direction, is format converted in the horizontal direction by a horizontal format converting part 105.

However, the related art apparatus for format converting a video has a disadvantage that the waste of the memory is relatively large since a large number of line memories are required for the high-resolution video. That is, the size of each line memory is increased since the size of each line memory is determined by the size of the input video, which was not format converted yet.

In order to resolve this disadvantage, a buffer may be utilized. However, it still has a problem that the memory bandwidth is increased if a vertical filter having a plurality of taps is used in order to obtain a good quality of the NTSC screen.

SUMMARY OF THE INVENTION

Accordingly, the present invention is directed to an apparatus and method for format converting a video that substantially obviates one or more of the problems due to limitations and disadvantages of the related art.

An object of the present invention is to provide an apparatus and method for format converting a video in which the size of a line memory is reduced by format converting the input video data in a horizontal direction, storing the video data in the line memory, and format converting the video data stored in the line memory in a vertical direction.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an apparatus for format converting a video according to an embodiment of the present invention includes: a horizontal format converting unit for format converting input video data in a horizontal direction suitable for horizontal output size; a line memory unit for storing the horizontally format converted video data for format conversion in a vertical direction; and a vertical format converting unit for format converting the video data output from the line memory unit in a vertical direction suitable for vertical output size.

The apparatus for format converting a video according to an embodiment of the present invention further includes an area division controller for receiving information on the number of lines of the video data required for the vertical format conversion in a next horizontal synchronization period from the vertical format converting unit, wherein the horizontal format converting unit temporally divides the video data in the horizontal direction in accordance with an area division control signal of the area division controller.

The horizontal format converting unit temporally divides the video data equivalent to the number of the lines provided from the vertical format converting unit in accordance with the area division control signal of the area division controller and sequentially format converts the temporally divided video data in a next horizontal synchronization period in turn.

The horizontal format converting unit temporally divides the respective lines equivalent to the number of the lines of the video data under the control of the area division controller.

The horizontal format converting unit temporally divides the respective lines in such a manner that each area of the respective lines partially overlaps a next area.

The apparatus for format converting a video according to an embodiment of the present invention further includes horizontal and vertical filters respectively at front ends of the horizontal format converting unit and the vertical format converting unit, for limiting band widths of the video data.

The line memory unit includes a plurality of line memories, and the number of the line memories is determined by the number of taps of the vertical filter at a rear end.

The apparatus for format converting a video according to an embodiment of the present invention further includes a data divider for sequentially dividing data stored in the line memories and outputting the divided data to the vertical filter.

In another aspect, an apparatus for format converting a video of the present invention includes: a vertical format converting unit for format converting the horizontally format converted video data in a vertical direction suitable for vertical output size and providing information on the number of lines of input video data required for the vertical format conversion in a next horizontal synchronization period; an area division controller for generating an area division control signal for temporally dividing the respective lines in a horizontal direction based on the information on the number of lines; a horizontal format converting unit for temporally dividing and format converting the input video data in accordance with the area division control signal of the area division controller; and a line memory unit for storing the horizontally format converted video data and outputting the stored data to the vertical format converting unit for the vertical format conversion.

The apparatus for format converting a video according to an embodiment of the present invention further includes horizontal and vertical filters respectively at front ends of the horizontal format converting unit and the vertical format converting unit, for limiting band widths of the video data.

The apparatus for format converting a video according to an embodiment of the present invention further includes a data divider for sequentially dividing data stored in the line memories and outputting the divided data to the vertical filter.

In other aspect, a method for format converting a video of the present invention includes the steps of: format converting the horizontally format converted video data in a vertical direction suitable for vertical output size and providing information on the number of lines of input video required for the vertical format conversion in a next horizontal synchronization period; generating an area division control signal for temporally dividing the respective lines in a horizontal direction based on the information on the number of lines; temporally dividing and format converting the input video data in accordance with the area division control signal of the area division controller; and storing the horizontally format converted video data and outputting the stored data to the vertical format converting step for the vertical format conversion.

The method for format converting a video according to an embodiment of the present invention further includes the steps of horizontally and vertically filtering the input video data respectively at front ends of the horizontal format converting step and the vertical format converting step to limit bandwidths of the input video data.

The horizontal format converting step includes the step of temporally dividing respective lines of the input video data equivalent to the number of the lines provided from the vertical format converting step in accordance with the area division control signal.

According to the present invention, an input video is format converted in a horizontal direction according to a horizontal output size to store in a line memory and the image stored in the line memory is format converted in a vertical direction according to a vertical output size, such that the amount of line memory required for video processing and bandwidths required for outputting various sizes of input videos including the high resolution video format used in the digital TVs by reducing into the NTSC or standard screen quality video format are minimized.

It is to be understood that both the foregoing general description and the following detailed description are exemplary and explanatory and are intended to provide further explanation of the invention as claimed.

DESCRIPTION OF THE PREFERRED EMBODIMENTS

Figure 1:
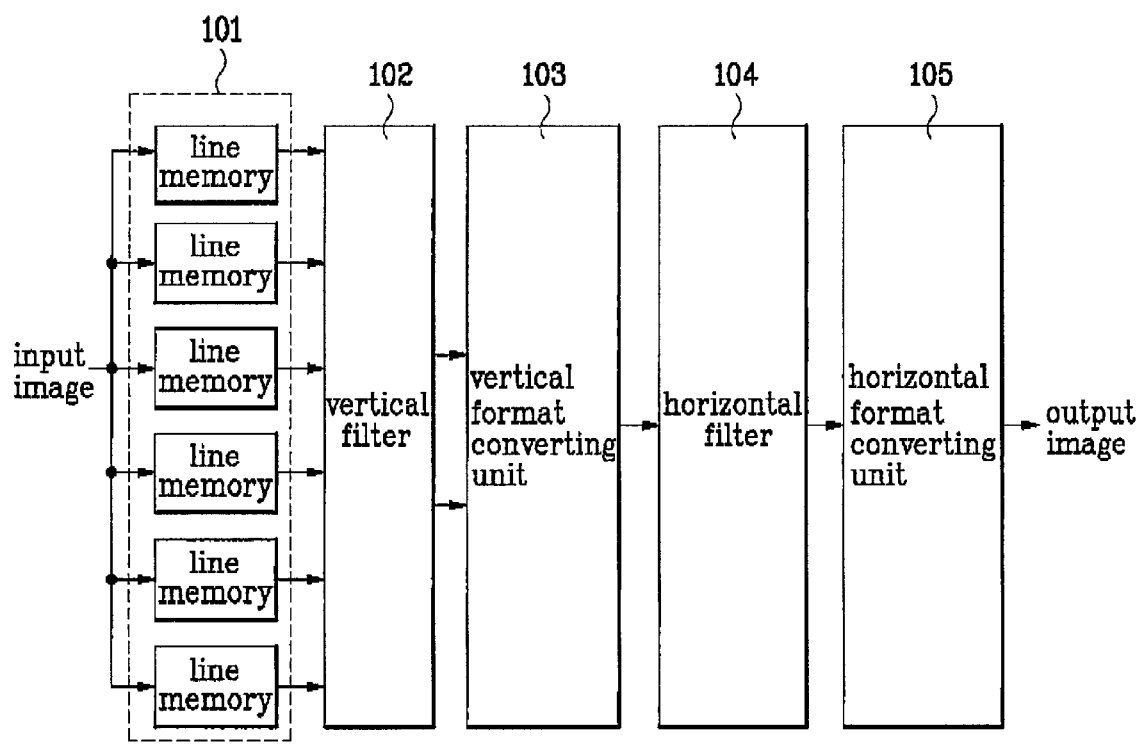
FIG. 1 is a block diagram of a general apparatus for format converting a video.
Figure 2:
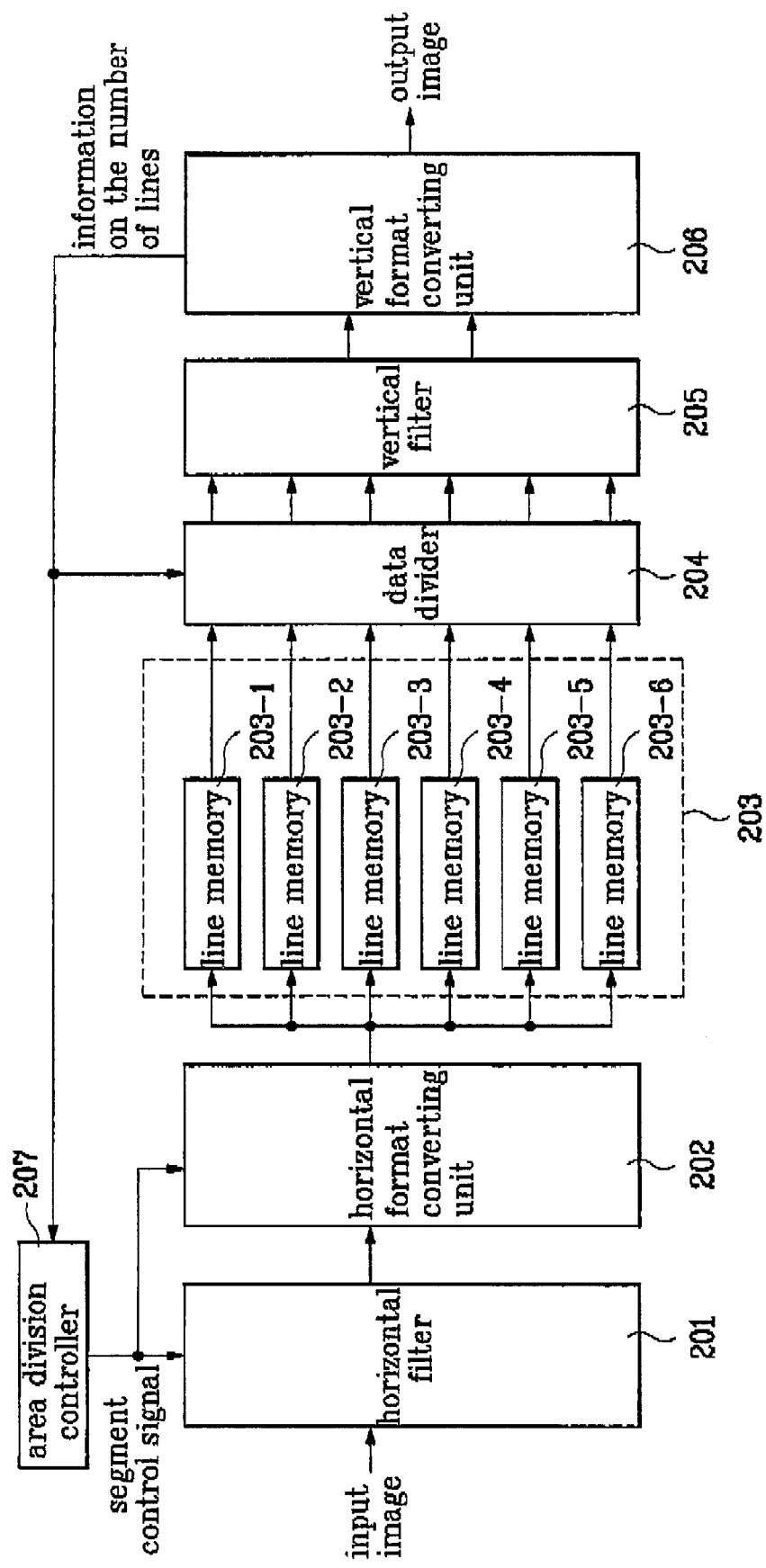
FIG. 2 is a block diagram of an apparatus for format converting a video according to the present invention.

FIG. 2 is a block diagram of an apparatus for format converting a video according to an embodiment the present invention. In FIG. 2, an apparatus for format converting a video includes a horizontal filter 102, a horizontal format converting unit 202, a line memory unit 203, a data distributor or divider 204, a vertical filter 205 and a vertical format converting unit 206, all operatively coupled.

An area division controller 207 generates a control signal for horizontal format converting by using information on the number of lines of the video data provided from the vertical format conversion unit 206. The horizontal format converting unit 202 temporally divides the horizontal lines of an input video according to the control signal from the area division controller 207.

That is, the area division controller 207 receives the information on the number of lines of input video data required for the vertical format converting in a next horizontal synchronization period and generates a proper control signal on the basis of the input information on the number of lines to the horizontal filter 201 and to the horizontal format converting part 202.

Figure 3:
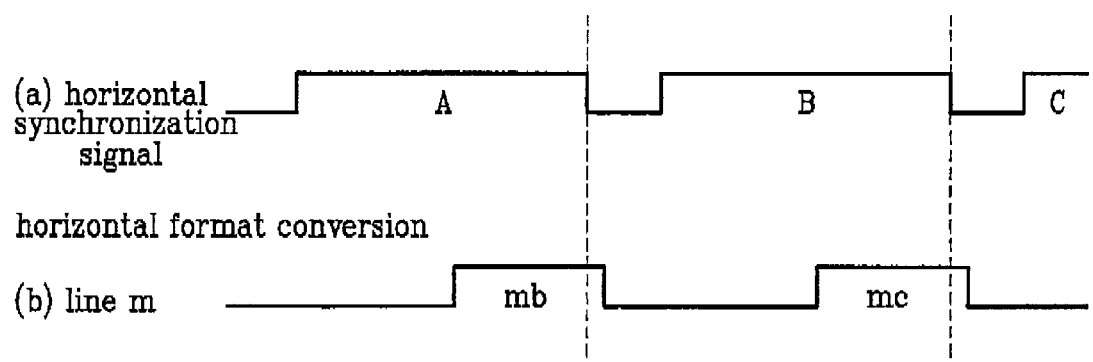
FIG. 3(a) and FIG. 3(b) are timing charts showing an example of horizontal format conversion in case that a line number data is '1' in FIG. 2.

In case that the information on the number of lines of the input video is '1', it means that one line of the input video should be processed in the horizontal format converting unit 202 in the next horizontal synchronization period. In this case, the one line of the input video is horizontally format converted as shown in FIG. 3 without area division. That is, a video data required for an area "B" of a horizontal synchronization signal is horizontally format converted in a period 'mb' of FIG. 3(b), wherein a horizontal size of the input video is format converted to a horizontal size of an output video.

Figure 4:
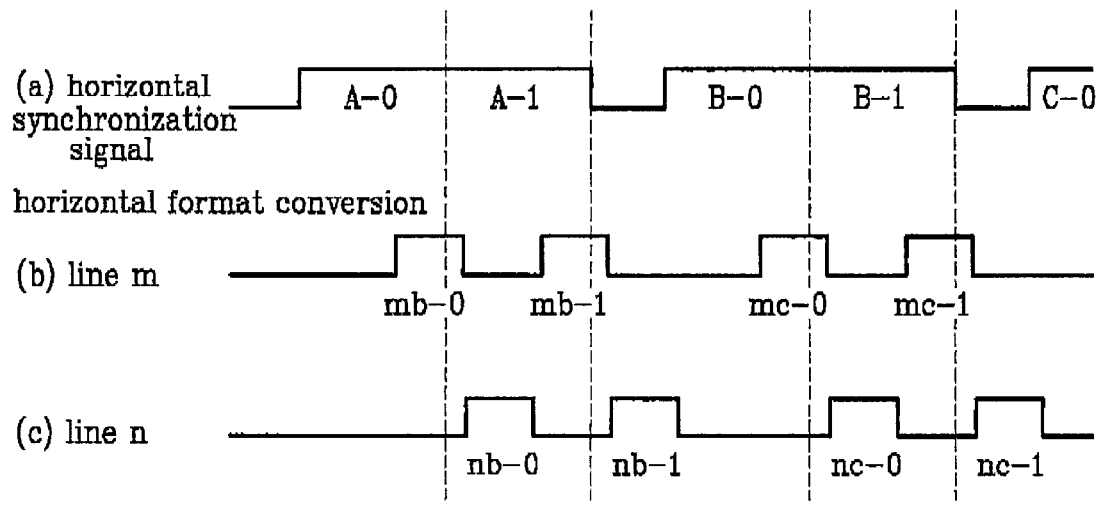
FIG. 4(a) to FIG. 4(c) are timing charts showing an example of temporally dividing horizontal format conversion in case that a line number data is '2' in FIG. 2.

In the meantime, in case that the information on the number of lines of the input video is '2', it means that two lines of the input video should be processed in the horizontal format converting unit 202 in the next horizontal synchronization period, for example, m and n. In this case, the two line of the input video are horizontally format converted after area division as shown in FIG. 4. That is, a video data required for an area "B-0" of a horizontal synchronization signal is horizontally format converted in periods 'mb-0' and 'nb-0' of FIG. 4.

As described above, the horizontal format converting unit 202 performs the horizontal format conversion according to an area division signal input from the area division controller 207. For example, if two lines are input to a next horizontal synchronization signal, two lines are divided and alternately format converted as shown in FIG. 4. First, a front part of line 'm' (for example, mb-0) is format converted, and then, a front part of line 'n' (for example, nb-0) are format converted. And then, an end part of the line 'm' (for example, mb-1) and an end part of the line 'n' (for example, nb-1) are format converted in sequence.

If the information on the number of lines is more than 2 but the format conversion is not carried alternately by temporal division, then the area 'mb-0' should be positioned at an end part of 'A-1 and this makes the whole operation difficult to perform. In particular, if a video of a plurality of lines should be processed, a plurality of horizontal format converters is required for processing lots of data in a period of which horizontal synchronization period is '0', which is practically impossible.

Therefore, in the present invention, an input video is temporally divided by a horizontal line of the input video according to the information on the number of lines and alternately format converted, such that the format conversion of the plurality of lines may be normally performed by a single horizontal format converting unit 202. At this time, for example, in case of the period 'mb-0', the end part of the period 'mb-0' is finished later than a dotted line.

If the end part of the period 'mb-0' is finished before the dotted line by advancing the period 'mb-0', an abnormal video is outputted since a video of a next line is input even though the vertical format converting in period 'A-0' of a horizontal synchronizing signal is not finished yet.

In this case, a longitudinal line appears in a central part of the output video. Similarly, the end part of the period 'mb-1' should be later than an end part of period 'A-1', or an abnormal longitudinal line appears in the end of the right of an output video.

This situation is equally applied in the case that the information on the number of lines of an input video is '1'. As shown in FIG. 3, in case of period 'mb', an end part of the period 'mb' should be later than an end part of a horizontal synchronizing signal period 'A', that is, the dotted line part.

The horizontal filter 201 prevents the aliasing possibly generated in an output video by limiting a bandwidth of an input video before the horizontal format converting. At this time, the horizontal format converting unit 202 has to perform an area division in a horizontal direction considering the horizontal filter 201. That is, the horizontal format converting unit divides the respective lines in such a manner that the respective lines partially overlap a next area. Otherwise, the format conversion performed without area division and the format conversion performed with the area division become different from each other, since right and left part data of a video is necessary a little more for the horizontal format conversion.

The line memory unit 203 including a plurality of line memories stores the horizontal format conversion results, wherein a size of the respective line memory is determined by the horizontal size of the format converted output video. The number of the line memories is determined by the number of taps of the vertical filter at a rear end. In general, if a size of an input video is smaller than a size of an output video, it is preferable to dispose the line memory in an input part in front of the horizontal format conversion unit. To the contrary, if a size of an input video is larger than a size of an output video, it is preferable to dispose the line memory in an output part behind the horizontal format converting unit, as embodied in the present invention.

Figure 5:
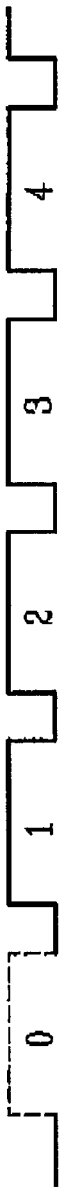
FIG. 5(a) to FIG. 5(c) are operational views showing the operations of a data divider of FIG. 2.

The line memory unit 203 stores input videos according to input sequence as shown in FIG. 5. However, the stored input videos are output according to the vertical format converting. A data distributor 204 is utilized for sequentially providing video data to the vertical filter. FIG. 5 shows line numbers of input videos to be stored in the line memory unit 203 and line numbers of videos to be output by passing through the data distributor 204. For example, if it is assumed that data of horizontally format converted line a to line f are sequentially stored in respective line memories 203-1~203-6, data of line a to line f are output via the data distributor 204 in a next horizontal synchronization period, and data of lines g and line h is sequentially stored in the line memories, where line a and line b have been stored.

In the next horizontal synchronizing period, data of line g and line h is stored in the line memories, where line a and line b have been stored, data of line c to line h are sequentially output via the data distributor 204, and data of line I and line j is stored in the line memory where the data of line c and line d have been stored.

The video data output via the data distributor 204 is input to the vertical filter 205, and the vertical filter 205 prevents the aliasing from the output video by limiting the band width of the input video.

The vertical format converting unit 206 performs the vertical format conversion according to the horizontal synchronizing signal. Also, information on the number of lines of the input video required for a next horizontal synchronizing signal is provided to the area divider 207, thereby operating the whole system in an organized manner.

As above, according to the present invention, an input video is format converted in the horizontal direction according to a horizontal output size to store in a line memory and the image stored in the line memory is format converted in the vertical direction according to a vertical output size, such that the amount of line memory required for video processing and bandwidths required for outputting various sizes of input videos including the high resolution video format used in the digital TVs by reducing into the NTSC or standard screen quality video format are minimized.

As described hereinabove, the apparatus and the method for format converting a video of the present invention may be utilized for converting various kinds of videos including high resolution videos to the NTSC or standard screen quality videos, since an input video is format converted in the horizontal direction according to a horizontal output size to store in the line memory unit and the image stored in the line memory unit is format converted in the vertical direction according to a vertical output size.

Further, a video data of one line is divided in the horizontal direction and a plurality of the divided lines are temporally format converted by using a single horizontal format converting unit, so that the utilized hardware becomes reduced. In particular, the format conversion may be performed with minimum memory band widths by effectively using the line memory unit on the basis of output and the temporal format conversion.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for format converting a video, the apparatus comprising:

a horizontal format converting unit for format converting input video data in a horizontal direction suitable for horizontal output size;

a line memory unit for storing the video data for format conversion in a vertical direction; and a vertical format converting unit for format converting the video data output from the line memory unit in a vertical direction suitable for vertical output size, wherein the horizontal format converting unit temporally divides the video data in a horizontal direction based on information on the number of lines of video data required for the vertical format conversion.

2. The apparatus as claimed in claim 1, further comprising an area division controller for receiving the information on the number of lines of the video data required for the vertical format conversion in a next horizontal synchronization period from the vertical format converting unit, wherein the horizontal format converting unit temporally divides the video data in the horizontal direction in accordance with an area division control signal of the area division controller.

3. The apparatus as claimed in claim 2, wherein the horizontal format converting unit temporally divides the video data related to the number of the lines provided from the vertical format converting unit in accordance with the area division control signal of the area division controller and alternately format converts the temporally divided video data in a next horizontal synchronization period.

4. The apparatus as claimed in claim 3, wherein the horizontal format converting unit temporally divides the respective lines, related to the number of the lines of the video data under the control of the area division controller.

5. The apparatus as claimed in claim 4, wherein the horizontal format converting unit temporally divides the respective lines so that the respective lines partially overlap a next area.

6. The apparatus as claimed in claim 1, further comprising horizontal and vertical filters respectively at front ends of the horizontal format converting unit and the vertical format converting unit, for limiting bandwidths of the video data.

7. The apparatus as claimed in claim 6, wherein the line memory unit includes a plurality of line memories and the number of the line memories is determined by the number of taps of the vertical filter at a rear end.

8. The apparatus as claimed in claim 7, wherein the size of each line memory is determined by the horizontal size of output video.

9. The apparatus as claimed in claim 6, further comprising a data distributor for sequentially changing the order of data stored in the line memories and outputting the divided data to the vertical filter.

10. An apparatus for format converting a video, the apparatus comprising:
   a vertical format converting unit for format converting horizontally format converted video data in a vertical direction suitable for vertical output size and providing information on the number of lines of input video required for vertical format conversion in a next horizontal synchronization period;
   an area division controller for generating an area division control signal for temporally dividing the respective lines in a horizontal direction based on the information on the number of lines;
   a horizontal format converting unit for temporally dividing and format converting input video in accordance with the area division control signal of the area division controller; and
   a line memory unit for storing the horizontally format converted video data and outputting the stored data to the vertical format converting unit for vertical format conversion.

11. The apparatus as claimed in claim 10, further comprising horizontal and vertical filters respectively at front ends of the horizontal format converting unit and the vertical format converting unit, for limiting bandwidths of the video data.

12. The apparatus as claimed in claim 11, wherein the line memory unit includes a plurality of line memories, and the number of the line memories is determined by the number of taps of the vertical filter at a rear end.

13. The apparatus as claimed in claim 12, wherein the size of each line memory is determined by the horizontal size of output video.

14. The apparatus as claimed in claim 10, wherein the horizontal format converting unit temporally divides the video data related to the number of lines provide from the vertical format converting unit in accordance with the area division control signal of the area division controller and alternately format converts the temporally divided video data in a next horizontal synchronization period.

15. The apparatus as claimed in claim 14, wherein the horizontal format converting unit temporally divides the respective lines equivalent to the number of the lines of the input video data in a horizontal direction.

16. The apparatus as claimed in claim 15, wherein the horizontal format converting unit temporally divides the respective lines so that the respective lines partially overlap a next area.

17. The apparatus as claimed in claim 11, further comprising a data distributor for sequentially changing the order of data stored in the line memories and outputting the divided data to the vertical filter.

18. A method for format converting a video, the method comprising the steps of:
   format converting horizontally format converted video data in a vertical direction suitable for vertical output size and providing information on the number of lines of input video required for vertical format conversion in a next horizontal synchronization period;
   generating an area division control signal for temporally dividing the respective lines in a horizontal direction based on the information on the number of lines;
   temporally dividing and format converting input video data in accordance with the area division control signal; and
   storing the horizontally format converted video data and outputting the stored data to the vertical format converting step for vertical format conversion.

19. The method as claimed in claim 18, further comprising the steps of horizontally and vertically filtering input video data respectively at front ends of the horizontal format converting step and the vertical format converting step to limit bandwidths of the input video data.

20. The method as claimed in claim 18, wherein the horizontal format converting step includes the step of temporally dividing respective lines of the input video data related to the number of the lines provided from the vertical format converting step in accordance with the area division control signal.

21. An apparatus for format converting a video, the apparatus comprising:
   a horizontal format converting unit for format converting input video data in a horizontal direction suitable for horizontal output size;
   a line memory unit for storing the video data for format conversion in vertical direction;
   a vertical format converting unit for format converting the video data output from the line memory unit in vertical direction suitable for vertical output size; and
   horizontal and vertical filters respectively at front ends of the horizontal format converting unit and the vertical format converting unit, for limiting bandwidths of the video data;
   a data distributor for sequentially changing the order of data stored in the line memories and outputting the divided data to the vertical filter.

* * * * *